United States Patent Office 3,202,433
Patented Aug. 24, 1965

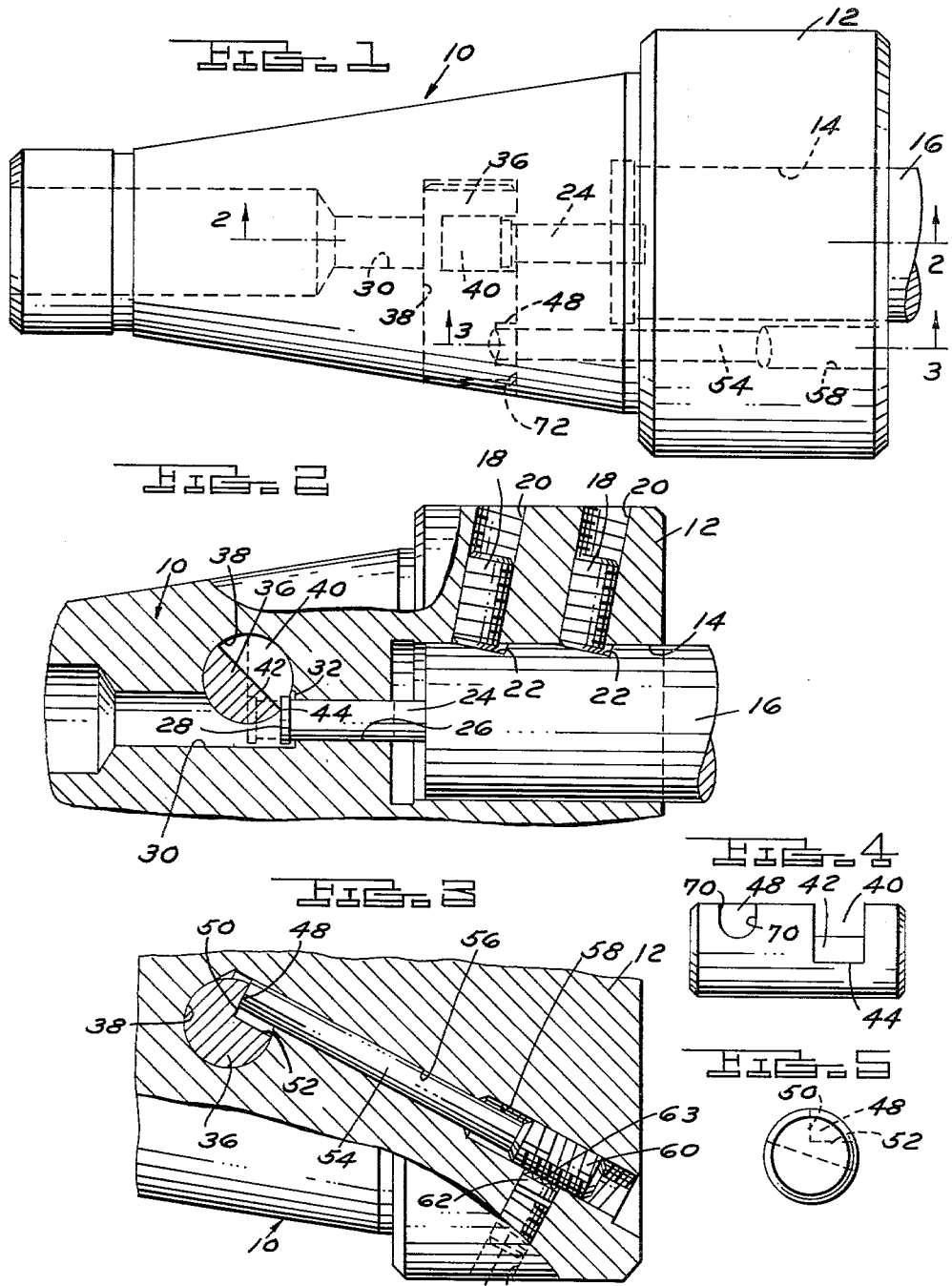

3,202,433
ADAPTER WITH ADJUSTMENT FOR SETTING CUTTERS
Arthur George Davis, 854 Grand Marais, Grosse Pointe Park, Mich.
Filed Feb. 24, 1964, Ser. No. 346,670
8 Claims. (Cl. 279—9)

This invention relates generally to tool holders, and refers more particularly to a tool holder in which the position of the tool can be readily adjusted.

One of the essential objects of the invention is to provide a tool holder having a socket for receiving a tool shank, and means for quickly and accurately adjusting the position of the tool shank in the holder.

Another object of the invention is to provide a tool holder having an adjustment pin projecting into the bottom of the socket, and provided further with means for axially moving the pin to correspondingly adjust the tool shank.

Another object is to provide a novel means for advancing the adjustment pin comprising a rotor mounted in the holder having means engageable with the end of the pin to axially move it when the rotor is rotated.

Another object is to provide an axially movable rod in the holder operatively connected to the rotor for rotating the same.

Another object is to provide a screw threaded in the holder and having end-to-end abutting engagement with the rod, for axially advancing the rod.

In accordance with further features of the invention, the rotor extends transversely of the adjustment pin and has a peripheral notch presenting an abutment surface engageable with the pin to axially move the pin when the rotor is rotated. The rotor also extends transversely of the rod and has a second peripheral notch spaced axially from the first presenting a second abutment surface adapted to be engaged by the rod.

Other objects and features of the invention will become more apparent as the description proceeds, especially when considered with the accompanying drawings, wherein:

FIGURE 1 is a side elevational view of a tool holder embodying my invention.

FIGURE 2 is a fragmentary sectional view taken on the line 2—2 of FIGURE 1.

FIGURE 3 is a fragmentary sectional view taken on the line 3—3 of FIGURE 1.

FIGURE 4 is a detail view in elevation of the rotor which forms a part of the means for adjusting the tool shank.

FIGURE 5 is an end view of the rotor.

Referring now more particularly to the drawings, the tool holder is generally designated 10 and as seen best in FIGURE 1 has an elongated tapered body and an enlarged outer end 12. A cylindrical socket 14 is formed centrally in the outer end 12 of the holder. Received in the socket is the shank 16 of a tool which may for example be the shank of a milling cutter. The shank 16 is cylindrical and has a close sliding fit in the socket.

The shank 16 is locked in the socket in axially adjusted position by the screws 18 in the parallel threaded holes 20 in the outer end 12 of the holder. The threaded holes 20 extend from the outer surface of the tool holder and open into the socket 14 through the side wall thereof. The tool shank 16 is formed with the spaced tapered flats 22 which are spaced apart a distance substantially equal to the distance between the threaded holes 20. When the screws 18 are threaded in, their leading ends engage the tapered flats 22 to lock the shank 16 in axially adjusted position. The holes 20 are inclined so that their axes extend at right angles to the tapered flats 22. Accordingly, the ends of the screws 18 will bear down directly upon the flats. The screws 18 obviously are capable of locking the tool shank in the socket throughout a limited range of axial adjustment.

In order to adjust the shank 16 axially, there is provided the cylindrical pin 24 which is capable of longitudinal sliding movement within the central axial passage 26 in the holder. This passage opens centrally into the bottom of the socket 14. The outer end of the pin 24 projects into the socket and engages the end of the tool shank. The opposite or inner end of the pin has an enlarged head 28 which is disposed in an enlarged extension 30 of the passage 26. Outward movement of the pin 24 is limited by engagement of its head 28 with the shoulder 32 separating the inner end of passage 26 from its enlarged extension 30.

In order to axially advance the pin 24 to adjust the tool shank, a substantially cylindrical rotor 36 is provided. The rotor 36 is capable of rotating in the transverse passage 38 in the body of the tool holder. The passage 38 extends at right angles to the passage 26 and cuts into the extension 30 thereof. Obviously, therefore, rotor 36 is at right angles to pin 24. In line with the pin 24, the rotor is provided with a peripheral notch 40. The notch 40 is a substantially diametrical notch, that is, the bottom surface 42 thereof is flat and passes through the axis of the rotor and is parallel to the axis of the rotor. The side walls of the notch are at right angles to the rotor axis. The edge 44 of the notch, that is the edge forming the junction between the bottom 42 of the notch and the peripheral surface of the rotor, engages the enlarged head 28 of the pin.

The rotor 36 has a second peripheral notch 48 which is spaced axially from the notch 40. The notch 48 has two plane surfaces 50 and 52, both of which are parallel to the axis of rotation of the rotor. The surfaces 50 and 52 form a right angle.

In order to rotate the rotor, there is provided a rod 54 which is axially slidable in a passage 56 of the holder. The rod 54 extends at right angles to the rotor. The end of the rod extends into the rotor passage 38 and abuts the surface 50 of notch 48. The outer end of the rod extends into an enlarged threaded hole 58 which connects with passage 56 and opens to the exterior through the outer end of the holder. A screw 60 is threaded into the hole 58 and abuts the outer end of rod 54.

In order to lock the screw 60 in adjusted position, there is a locking member 62 in a threaded hole 64 in the holder. This hole opens to the exterior and a screw 66 threads into the passage behind the member 62. The member 62 does not thread in the hole but is free to slide axially. Member 62 is formed with threads 63 on its end face complementing the threads on screw 60, so that when member 62 is forced tightly against the threaded surface of screw 60, the latter will be locked in position. Screw 66 is employed to advance the member 62 under pressure.

In order to adjust the shank 16, the screws 18 are first backed off to release the shank. Then, to advance the shank 16 in an outward direction, screw 66 is first backed off to release screw 60, and screw 60 is advanced to advance rod 54 and thereby rotate rotor 36 by reason of the contact of the end of rod 54 with the surface 50 of notch 48. Rotation of rotor 36 (counterclockwise in FIG. 2) operates to advance the pin 24 in an outward direction through the engagement of the edge 44 of notch 40 with the head 28 of the pin. The tool shank is correspondingly advanced. In order to retract or move the tool shank in an inward direction, the rod 54 must be permitted to withdraw in an outward direction by backing off the screw 60. Then pressure can be applied in an inward direction on the tool shank, forcing the pin 24 in an inward direction and in return rotating the rotor. The screws 18 are tightened to clamp the tool shank in adjusted position. The screw 66 may also be tightened to lock screw 60.

The end of rod 54 extending into notch 48 is confined between the side walls 70 of the notch, preventing the rotor 36 from moving axially. The rotor can be removed through the open end 72 of passage 38 by first withdrawing the rod 54 from notch 48.

What I claim as my invention is:

1. In a tool holder having a socket in its outer end for receiving a tool shank, means for axially adjusting the shank in said socket including a pin, an axial passage in said holder opening into the bottom of said socket, said pin being axially slidable in said passage and having its outer end projecting into said socket, and means carried by said holder for axially adjusting said pin including a rotor extending transversely of said pin and mounted for rotation in said holder, said rotor having a peripheral notch presenting an abutment surface spaced from the axis of said rotor and engageable with said pin to axially move said pin when said rotor is rotated, and means for rotating said rotor, said means for rotating said rotor including a rod axially slidably mounted in a passage in said holder, one end of said rod engaging said rotor at a point spaced from the axis of said rotor so as to rotate said rotor upon axial movement of said rod, and means for axially moving said rod.

2. The structure defined in claim 1, wherein the means for axially moving said rod comprises a screw threaded in said holder and having end-to-end abutting engagement with said rod, said screw being accesible for manual operation thereof.

3. In a tool holder having a socket in its outer end for receiving a tool shank, means for axially adjusting the shank in said socket including a pin, an axial passage in said holder opening into the bottom of said socket, said pin being axially slidable in said passage and having its outer end projecting into said socket, and means carried by said holder for axially adjusting said pin including a rotor extending transversely of said pin and mounted for rotation in said holder, said rotor having a peripheral notch presenting an abutment surface spaced from the axis of said rotor and engageable with said pin to axially move said pin when said rotor is rotated, said rotor having a second peripheral notch spaced axially from the first presenting a second abutment surface spaced from the axis of said rotor, and means for rotating said rotor including a rod extending transversely of said rotor and axially slidably mounted in a passage in said holder, one end of said rod engaging said second abutment surface so as to rotate said rotor upon axial movement of said rod, and means for axially moving said rod comprising a screw threaded in said holder and having end-to-end abutting engagement with said rod, said screw being accessible for manual operation thereof.

4. The structure defined in claim 3, wherein locking means are provided engageable with said screw for holding the same in adjusted position.

5. In a tool holder having a socket for receiving a tool shank, means for axially adjusting the shank in the socket including a pin carried by said holder and projecting into said socket, and means for moving said pin in the direction of its length to adjust the tool shank including a rotor mounted for rotation in said holder and extending transversely of said pin, said rotor having a peripheral notch presenting an abutment surface spaced from the axis of rotation of said rotor and engageable with the end of said pin to axially move said pin when said rotor is rotated, a rod extending transversely of said rotor and axially slidably mounted in said holder, one end of said rod engaging said rotor at a point spaced from the axis of said rotor so as to rotate said rotor upon axial movement of said rod, and means for axially moving said rod.

6. The structure defined in claim 5, wherein the means for axially moving said rod comprises a screw threaded in said holder and having end-to-end abutting engagement with said rod, said screw being accessible for manual operation thereof.

7. In a tool holder having a socket for receiving a tool shank, means for axially adjusting the shank in the socket including a pin carried by said holder and projecting into said socket, and means for moving said pin in the direction of its length to adjust the tool shank including a rotor mounted for rotation in said holder and extending transversely of said pin, said rotor having means engageable with said pin to move said pin in the direction of its length when said rotor is rotated, and a rod extending transversely of said rotor and mounted in said holder for movement in the direction of its length, said rod engaging said rotor and adapted to rotate the same when said rod is moved in the direction of its length.

8. In a tool holder having a socket for receiving a tool shank, means for axially adjusting the shank in the socket including a pin carried by said holder and projecting into said socket, and means for moving said pin in the direction of its length to adjust the tool shank including a rotor mounted for rotation in said holder and extending transversely of said pin, said rotor having means engageable with said pin to move said pin in the direction of its length when said rotor is rotated, a rod extending transversely of said rotor and mounted in said holder for movement in the direction of its length, said rod engaging said rotor at a point spaced from the axis of said rotor so as to rotate said rotor upon movement of said rod in the direction of its length, and means for moving said rod in the direction of its length.

References Cited by the Examiner

UNITED STATES PATENTS

| 1,037,799 | 9/12 | Schafer | 279—103 |
| 1,772,953 | 8/30 | Lilleberg | 279—103 |
| 2,513,139 | 6/50 | Burness. | |
| 2,776,590 | 1/57 | Korienek. | |

ROBERT C. RIORDON, *Primary Examiner.*